United States Patent [19]

Pitcher

[11] 4,267,022
[45] May 12, 1981

[54] ENERGY EFFICIENT PROCESS AND APPARATUS FOR DESALINIZING WATER

[76] Inventor: Frederick L. Pitcher, 310 Hale St., Beverly, Mass. 01915

[21] Appl. No.: 900,079

[22] Filed: Apr. 26, 1978

Related U.S. Application Data

[63] Continuation-in-part of Ser. No. 791,602, Apr. 27, 1977, abandoned.

[51] Int. Cl.³ .................... C02F 1/16; B01D 1/00
[52] U.S. Cl. ........................... 203/11; 203/21; 203/100; 203/DIG. 4; 62/4; 202/185 B; 202/205; 202/235
[58] Field of Search .............. 203/DIG. 4, DIG. 8, 203/DIG. 17, 10, 11, DIG. 1, 49, 100, 21, 25, 27, 24; 202/234, 233, 235, 205, 163, 167, 185 R, 185 B; 62/4

[56] References Cited

U.S. PATENT DOCUMENTS

| | | | |
|---|---|---|---|
| 1,466,670 | 9/1923 | Monti | 203/DIG. 4 |
| 2,677,243 | 5/1954 | Telkes | 62/4 |
| 2,975,107 | 3/1961 | Friedman | 203/DIG. 4 |
| 3,206,379 | 9/1965 | Hill | 203/11 |
| 3,257,291 | 6/1966 | Gerber | 203/49 |
| 3,312,600 | 4/1967 | Morton | 203/DIG. 4 |
| 3,363,664 | 1/1968 | Villanueva | 203/49 |
| 3,397,119 | 8/1968 | Bourland | 203/DIG. 4 |
| 3,699,006 | 10/1972 | Hasslacher | 203/DIG. 4 |
| 4,044,819 | 8/1977 | Cottingham | 62/4 |
| 4,091,623 | 5/1978 | Edmondson et al. | 203/100 |

FOREIGN PATENT DOCUMENTS 964504  5/1957  Fed. Rep. of Germany ............ 203/49

*Primary Examiner*—Wilbur L. Bascomb, Jr.

[57] ABSTRACT

Method and apparatus for desalinizing water. Salt water in an evaporation zone is provided with heat of vaporization by a heat pump which transfers heat to the water from a thermal sink. The evaporation zone is maintained at subatmospheric pressure so that the salt water boils at a temperature at least about 10 degrees above the ambient dew point. The pressure in the evaporation zone is maintained at a low level by a vacuum pump and by condensing the vapor in a condensation zone from which fresh water is collected. The heat of condensation is dissipated into a "cold" sink if available or by a heat dissipating means such as an evaporative cooling apparatus. Energy efficiency results from the ability of the heat pump or pumps in the system to operate at a high coefficient of performance.

20 Claims, 7 Drawing Figures

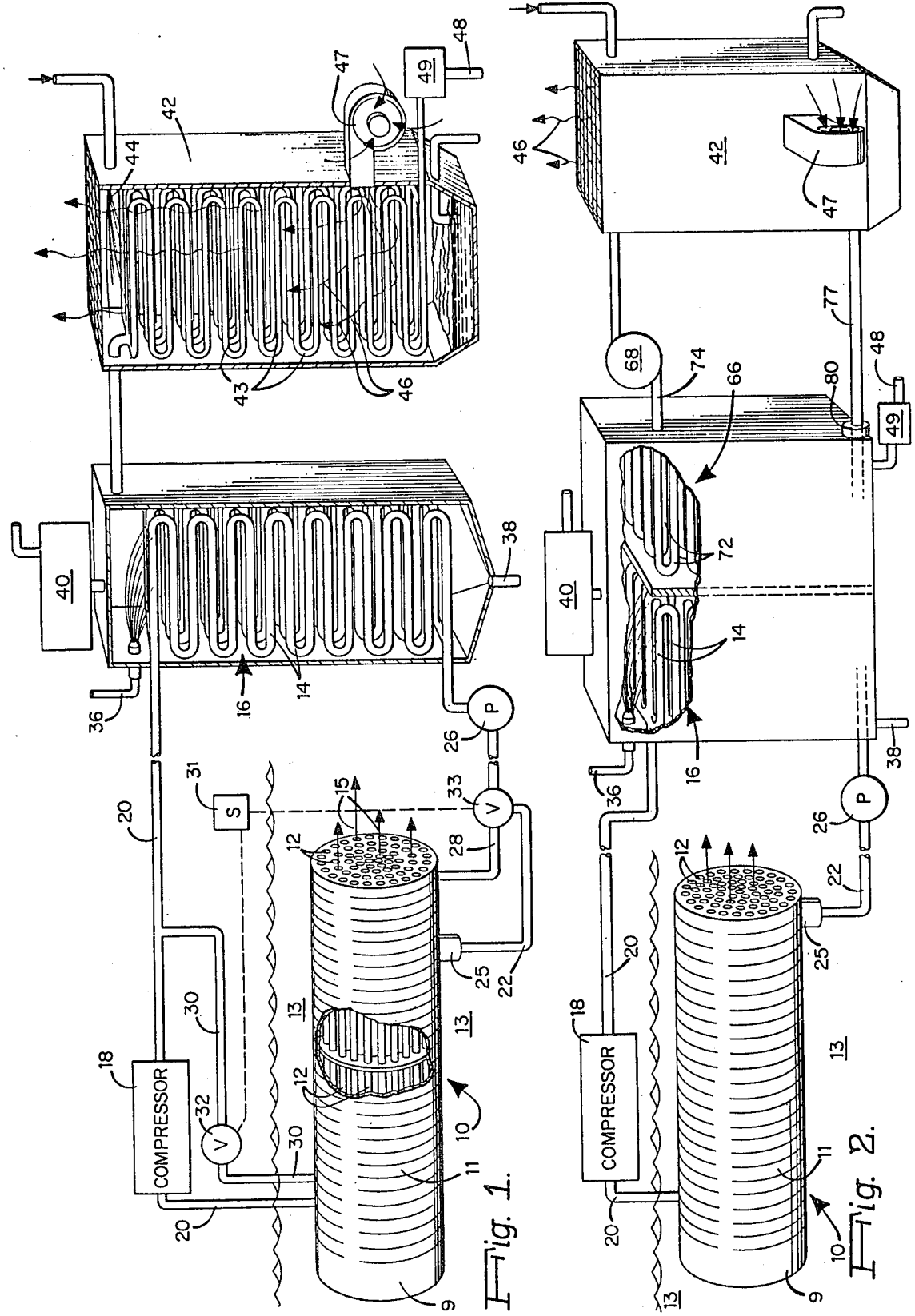

ENERGY EFFICIENT PROCESS AND APPARATUS FOR DESALINIZING WATER

REFERENCE TO RELATED APPLICATIONS

This application is a continuation-in-part of copending U.S. application Ser. No. 791,602 filed Apr. 27, 1977 and now abandoned, for Energy Efficient Process and Apparatus for Desalinization of Water.

BACKGROUND OF THE INVENTION

This invention relates to an energy efficient process and apparatus for desalinizing water, and more particularly to a desalinization system which uses a temperature differential created within the context of the weather environment in which the apparatus is located to furnish the heat of vaporization required to boil salt water and to dissipate heat of condensation.

There are many known methods of desalinizing water based on distillation. Considerable effort has been expended attempting to design a system capable of producing fresh water at a cost low enough to service a large population or agricultural area. In general, the approach has been to conserve the heat given up when water vapor condenses to vaporize additional quantities of water, thus reducing the total amount of heat used per unit mass of fresh water produced.

In designing a desalinization system, there are essentially two areas of cost which must be considered: initial capital outlay; and the ongoing operational cost which includes the price of the energy consumed and the price of maintenance. In areas where local natural supplies of fresh water are low, the capital costs of constructing a large desalinization plant will often be competitive with the costs of a pipeline. However, operational expenses are another matter, and as the cost of energy increases, the possibility that desalinization water can compete with piped sources of fresh water has become more remote. Nevertheless, there are areas of the world which could be developed to support sizeable populations if provided with fresh water, yet many of these are located such that no significant possibility exists for servicing the land with natural fresh water.

Almost by definition, these areas are hot and dry, and accordingly are characterized by low humidity and days of uninterrupted direct solar exposure. Under these conditions, it is now possible to produce a sizeable temperature differential without consuming energy generated from fossil or nuclear fuels. Rather, "hot" and "cold" thermal sinks may be produced by taking advantage of ambient conditions.

SUMMARY OF THE INVENTION

The instant invention comprises a process and apparatus for desalinizing water which can take advantage of a natural or artifically created temperature differential to provide the heat of vaporization necessary to boil salt water and to dissipate the heat of condensation produced on formation of pure water. Only minimal amounts of energy are required. Furthermore, the capital cost is believed to be no greater than that required for a conventional desalinization system. The foregoing characteristics make the instant invention highly attractive and are directly traceable to the novel combination of process steps and components disclosed herein.

In its broadest overall aspect, the invention involves moving heat from a "hot" thermal sink of the types disclosed herein to an evaporation zone which is maintained at subatmospheric pressure, allowing vapor produced on boiling to migrate to a condensation zone, and moving heat of condensation from the condensation zone into a "cold" sink. At least one of the heat transfers, either from the hot sink to the evaporation zone or from the condensation zone to the cool sink, is effected via a closed system wherein a refrigerant is cyclically condensed and evaporated (e.g., a refrigeration cycle or a "thermal cycle") and wherein the ratio of energy transferred as heat to energy required to effect the transfer is at least 15 and preferably 30 or above.

Thus, in the process of the invention, salt water is fed into an evaporation zone which is maintained at a subatmospheric pressure low enough to cause the water to boil at close to ambient temperatures. In order to maintain boiling, heat is transferred to the water in the evaporation zone from a thermal sink, preferably using a heat pump. To assure that the vacuum is maintained, the evaporation zone is serviced by an evacuation system for removing non-condensibles and the water vapor produced is condensed in a condensation zone from which heat is removed as water is formed by being dissipated into a cold sink. The cold sink may comprise a naturally occurring relatively low temperature sink such as ocean water or an evaporative cooling apparatus which takes advantage of a low humidity environment.

The thermal sink from which heat is transported to maintain boiling is not created by burning fuels and is not normally a high temperature heat source. However, it is contemplated that waste heat from a nuclear power plant or some other available source of water such as a naturally occurring hot spring may be utilized if available. In general, the thermal sink is characterized in that heat it gives up to water in the evaporation zone is made up by heat which would otherwise be discarded, e.g. relatively "low level" heat. Thus, otherwise expendable heat is dissipated into the thermal sink as makeup heat from, for example, the sun. Accordingly, the thermal sink may comprise an artifically created high surface area lake which is fed with salt water and covered with a transparent sheet to retard evaporation. It may comprise a mass of material having a suitable melting point which stores up solar heat as heat of fusion such as Glauber's salt. The thermal sink may simply comprise the surrounding air or an area of the ground exposed to the sun. In this case, a heat collecting means will be required.

The heat pump which is used to transport heat comprises either a refrigeration cycle or a "thermal cycle" of the type hereinafter described. When hot water from geothermal or nuclear cooling water sources is available, no heat pump whatever need necessarily be employed. In this case, the heat of vaporization required to maintain boiling may be provided by direct heat exchange. To dissipate the heat of condensation, a naturally occurring sink, such as ocean water, having a temperature lower than the reduced pressure boiling point or evaporative cooling may be employed.

Evaporative cooling apparatus is well known in the heat exchange art and comprises a heat exchanger over which water is cascaded and air is moved. As the cascading water evaporates, the outer surfaces of the coils of the exchanger tend to seek thermal equilibrium with the dew point. Fluid in contact with inner surfaces of the coils seeks the same equilibrium. Within certain limits, the temperature may be controlled by varying the amount of air forced through the apparatus. In accordance with the invention, the condensation zone may comprise a portion of the interior of such an evaporative cooling apparatus, or may comprise a separate zone serviced by a refrigeration or thermal cycle for transporting heat therefrom to a low temperature sink or to evaporative cooling apparatus.

In one important embodiment, the apparatus of the invention comprises both a refrigeration cycle and a thermal cycle, arranged in parallel, to transport heat from the thermal sink to the evaporation zone. If a switch is utilized to activate one of the two cycles at a particular time, in a manner disclosed herein, it is possible to adapt the desalinization apparatus for maximum output at minimum energy as dictated by the varying temperature differential between the thermal sinks, e.g., in response to fluctuations in the ambient dew point.

Accordingly, objects of the invention include the provision of a method and apparatus for desalinizing water which consumes no fossil or nuclear fuels other than that which may be required to generate the electricity needed to run the electric motors which service compressors, vacuum pumps, or the like.

Another object of the invention is to provide a water desalinization system which can undergo a change in mode of operation in response to changes in ambient conditions as required for low energy consumption. Still another object is to provide a water desalinization system characterized by a capital outlay low enough to be competitive with conventional systems. Another object is to provide a desalinization apparatus which desalinizes water at close to ambient temperature and thus reduces or eliminates the buildup of scale and requires no insulation to prevent heat loss. Yet another object is to provide a water desalinization apparatus which may be scaled to provide the fresh water requirements for an ocean going vessel or the like or for a population center or agricultural area.

Still other objects of the invention are to provide a water desalinization process and apparatus which may be designed to take advantage of the ambient conditions of a particular locality to produce fresh water at the lowest practical cost, and to provide a novel desalinization system and process which employs components well known in the heat exchange, refrigeration, and related arts, and which will accordingly minimize design engineering problems.

These and other objects and features of the invention will be apparent to those skilled in the art from the following description of some preferred embodiments and from the drawing.

BRIEF DESCRIPTION OF THE DRAWING

FIG. 1 is a schematic diagram illustrating one important embodiment of the water desalinization apparatus of the invention;

FIG. 2 is a schematic diagram illustrating a second embodiment of the apparatus of the invention;

Like reference characters in the respective figures indicate corresponding parts. All temperatures are in Farenheit degrees.

DESCRIPTION OF THE PREFERRED EMBODIMENT

Figure 3:
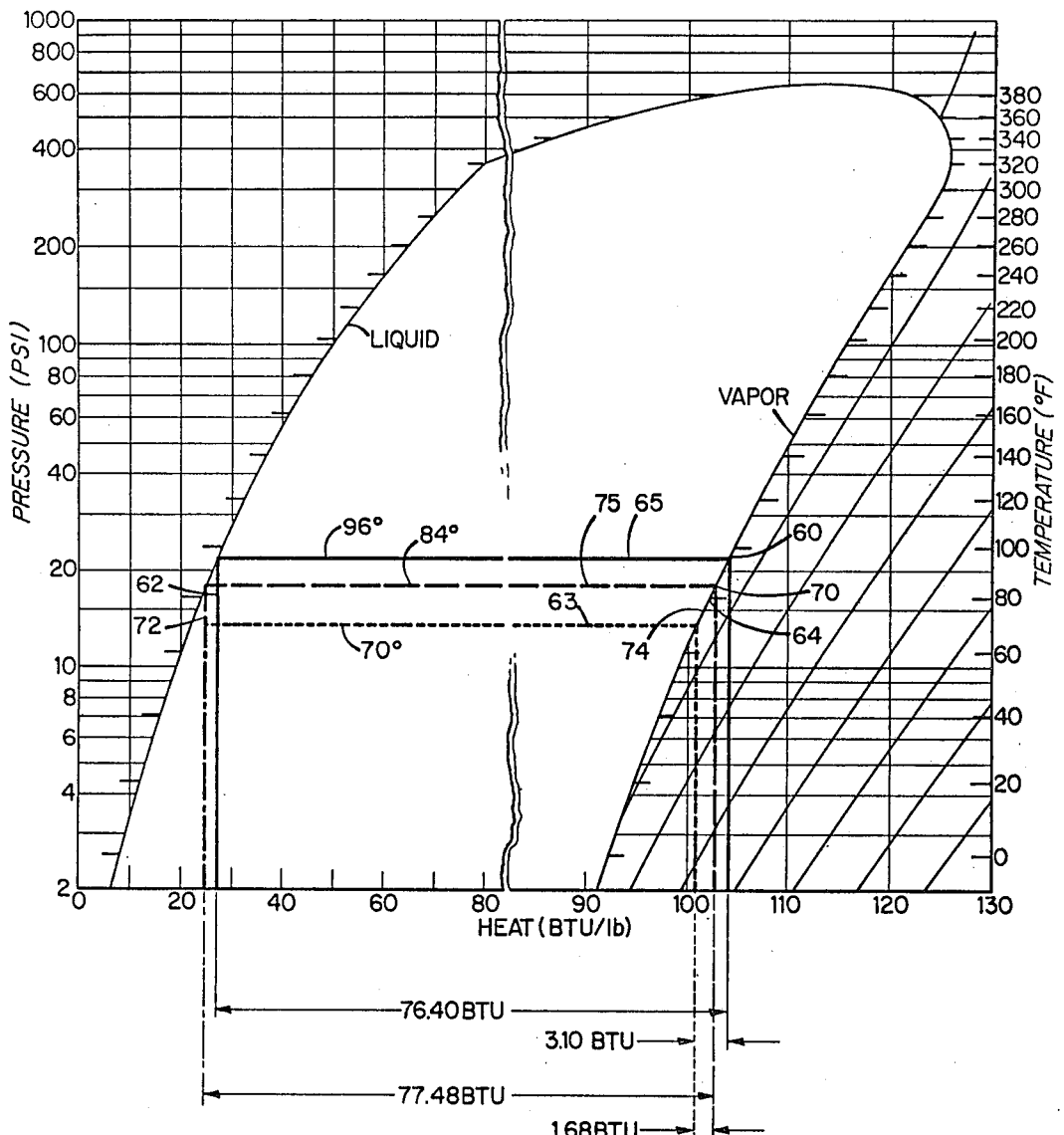
FIG. 3 is a phase diagram for refrigerant 11 (trichlorofluoro methane) useful in illustrating the energy efficiency of the process of the invention and showing the thermal characteristics and changes of state which the refrigerant undergoes in two refrigeration cycles.

The energy efficiency of the desalinization process and apparatus of the invention ultimately depends on the difference in temperature which is naturally present or can be created within the context of the area in which the apparatus is located. The greater the temperature differential, the lower will be the energy requirements. Accordingly, it is desirable to design the system to exploit a naturally occurring temperature differential or to create and maintain the greatest temperature differential possible under the circumstances. It is not within the scope of the invention to, for example, create a thermal sink by burning fossil fuels to heat a boiler. However, in situations where fuels are already being consumed for other purposes, the otherwise expendable waste heat may be absorbed in water or otherwise dissipated within a mass of material to maintain the temperature of the thermal sink. Where such heat sources are not available, the thermal sink may comprise a body of salt water, either natural or man made, which is exposed to the sun and includes means for inhibiting evaporation such as a transparent plastic sheet placed over its surface. In this circumstance, the body of water will thermally equilibrate with its environment and heat removed from the water will be made up by the sun.

Another useable thermal sink is the air itself. Thus, in desert areas, the mean air temperature may approach 85° or more and thus can provide a limitless heat supply. In this situation, a high surface area heat collecting structure designed using principles similar to those employed in constructing heat exchangers will be required. Use of this type of thermal sink is characterized by significant fluctuations in temperature, but in accordance with the principles disclosed hereinafter, such fluctuations may be handled simply and automatically.

Another possibility for the thermal sink is an expanse of hot sand. Thus, heat can be extracted from the earth itself via coils placed just below the surface. This type of sink would also undergo daily temperature fluctuations.

Still another possibility for the thermal sink is a mass of material having a high heat of fusion and a melting point suitable to allow changes of state at close to ambient temperatures, e.g., Glauber's salt, $Na_2SO_4.10H_2O$ (M.P.=213°). These can be melted by being exposed to the sun, the sun's energy being stored as heat of fusion, and large quantities of heat may be removed therefrom.

It is from one of the foregoing types of thermal sinks or others that may be envisioned that heat is extracted to provide the heat of vaporization which maintains boiling in the process and apparatus of the invention in a reduced pressure evaporation zone. To maintain boiling, it is necessary to assure that the pressure above the boiling salt water does not build up. Thus, the build-up of noncondensibles is prevented by employing a vacuum pump. Also, water vapor must be condensed and the heat of condensation must be removed. If the boiling point is high enough, condensation may be effected, for example, by direct heat exchange with ocean water. However, alternatively, heat of condensation may be removed by evaporative cooling.

Evaporative cooling devices are well known in the heat exchange art and in general may readily be designed on a scale suitable for any particular application. These devices comprise heat exchangers which typically contain a fluid from which heat is to be extracted. The exterior surface of the heat exchanger is contacted with water and a fan blows air across the surface to cause evaporation. The temperature which can be obtained in the interior of the apparatus is dependent on the ambient dewpoint. At the present state of the art, it is a matter of mechanical skill to maintain fluid contained within an evaporative cooling apparatus at a temperature substantially equal to the dew point. Thus, the temperature which can be obtained by evaporative cooling will vary as the dew point varies.

Utilizing the techniques disclosed above, it is possible to readily create a temperature differential of at least 20°, that is, to obtain a condition wherein the temperature of the "hot" thermal sink is 20° higher than the temperature of a "cold" sink or that within an evaporative cooling apparatus. In most situations, much larger temperature differentials can be produced. Also, there are many situations where a natural temperature differential exists and need only be properly exploited. An example is the sea, where surface water layers and deep water layers differ significantly in temperature.

The invention contemplates boiling water to be desalinized in an evaporation zone, transferring heat from the thermal sink to the evaporation zone to provide the heat of vaporization, and then condensing the vapor by removing heat therefrom and dissipating it into a lower temperature thermal sink or via evaporative cooling. To lower the boiling point of the water, the evaporation zone (and condensation zone) is evacuated to a pressure less than the vapor pressure of the salt water to be boiled and is serviced by a vacuum pump for removing noncondensibles.

Figure 7:
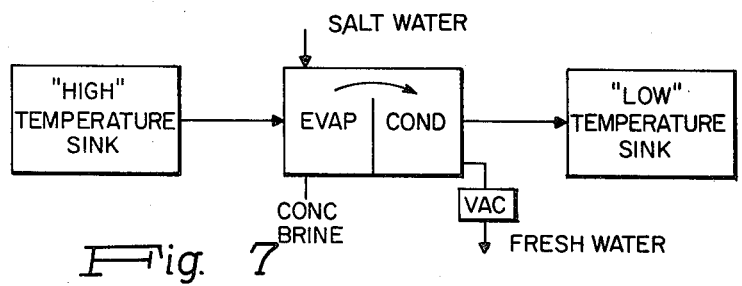
FIG. 7 is a diagram illustrating the flow of heat in accordance with the invention.

FIG. 7 illustrates the broad concept of the invention. Heat is moved from the "high" temperature sink to the evaporation zone where it is utilized as heat of vaporization. Vapor passes to the condensation zone where it is condensed. The heat of condensation is transported to the "low" temperature sink. A vacuum pump removes noncondensibles from the evaporation and condensation zone and draws fresh water from the evacuated system. The greater the temperature difference between the sinks, the less energy required to move heat to the evaporation zone and from the condensation zone, and/or the smaller the heat exchangers required. The means for moving heat, both to the boiling salt water and from the condensing fresh water comprises a refrigeration cycle, a "thermal cycle", or, in an appropriate case a heat exchanger wherein heat is transferred directly. The energy efficiency of the system arises because the refrigeration cycle may be run at very high coefficients of performance, and because the ratio of energy transferred as heat to energy required to effect the transfer in the thermal cycle is very high.

FIG. 1 illustrates an important embodiment of the apparatus of the invention. Water or other heat carrying fluid is moved by a high volume, low pressure pump 9 from a thermal sink 13 through heat exchanger 10. As illustrated, the heat exchanger 10 comprises a jacket 11 which encloses an array of pipes 12. Water flows through the pipes, loses heat to fluid located in the interstices therebetween, and exits in the direction of arrows 15. Heat exchanger 10 is maintained in thermal communication with an evaporation zone 16 and the heat exchanger 14 disposed therein by a pair of heat pumps arranged in parallel. The first heat pump is a refrigeration cycle comprising a compressor 18 which circulates a refrigerant, e.g., one of the family of fluorocarbons sold under the trademark Freon, along conduit 20, through the coils of heat exchanger 14, back through a pump 26, valve 33, and conduit 22, through a float valve 25 (or other means for allowing expansion, such as a restriction), through heat exchanger 10, and back to conduit 20. The second heat pump is a "thermal cycle" comprising a pump 26 which circulates refrigerant through valve 33, conduit 28, heat exchanger 10, conduit 30 and valve 32, and heat exchanger 14. A switch 31 controls valve 32 and three-way valve 33 so that either the thermal cycle or the refrigeration cycle may be activated. When the refrigeration cycle is activated, refrigerant freely passes through the pump 26 or, if necessary, its circulation may be assisted thereby.

Heat exchanger 14 is disposed within the evaporation zone 16 which receives water to be desalinized at inlet 36 and expels a more concentrated brine at waste outlet 38 with the aid of a pump (not shown). A subatmospheric pressure is maintained within evaporation zone 16 by a vacuum maintaining means 40. There are several suitable methods of removing noncondensibles from the evaporation zone 16 which do not require large amounts of energy. Thus, high efficiency two stage pumps are commercially available which are capable of creating and maintaining a vacuum. Alternatively, a small pump can transport gas from the low vacuum in evaporation zone 16 to a higher subatmospheric pressure zone (not shown) which itself is maintained at reduced pressure by a high volume, relatively low efficiency pump. Still another alternative is to utilize an ejector to produce a vacuum of a pressure close to the vapor pressure of the water which passes through the ejector, and to employ a small vacuum pump to transport gas from the evaporation zone into the ejector created vacuum. It may be preferable to locate vacuum maintaining means 40 in the condensation zone as illustrated in FIG. 7 to assist in vapor transport.

The evaporation zone 16 is in communication with a condensation zone 43, which in this embodiment takes the form of a portion of the interior of an evaporative cooling apparatus 42. The evaporative cooling apparatus comprises a heat exchanger over which salt water 44 is cascaded and air 46 is blown by a fan 47. The temperature within evaporative cooling apparatus 42 may be as low as the ambient dew point, or warmer is less air is passed over the coils.

To illustrate the operation of the apparatus of FIG. 1, it will first be assumed that on a given day the dew point is 76° and the temperature of the thermal sink and thus of the coils 12 is 80°. Salt water is fed into evaporation zone 16 at 36 and a subatmospheric pressure is maintained by vacuum pump 40 to the degree necessary to initiate boiling of the salt water. As boiling commences and heat of vaporization is lost, the salt water begins to cool. However, the temperature in the evaporation zone is maintained as the boiling water picks up heat from heat exchanger 14. If the pressure within evaporation zone 16 is maintained such that the boiling point of the salt water is 86°, the 86° vapor will condense within the 76° condensation zone 43, heat of condensation being dissipated by the evaporative cooling apparatus 42, and fresh water being produced at 48. The 10° temperature differential between the vapor and condensation zone 42 is effective to promote the heat exchange necessary to maintain the rate of condensation. A small pump 49 removes fresh water from the reduced pressure environment within condensation zone 43.

In the situation here hypothesized, the thermal sink is at 80° and the water in the evaporation zone 16 boils at 86°. Accordingly, the refrigeration cycle must be employed.

With valve 32 closed and valve 33 open to conduit 22, refrigerant vapor taken from heat exchanger 10 through conduit 20 is compressed by compressor 18, which is designed in accordance with known principles for moving large volumes of refrigerant vapor a relatively low pressure differentials. The action of the compressor raises the temperature of the vapor to 96° and propels it into the coils of heat exchanger 14 disposed within the evaporation zone 16. In the heat exchanger 14, the 96° vapor condenses, giving up its heat of condensation to the 86° boiling water. The liquid refrigerant next passes through pump 26, conduit 22, and back into the heat exchanger 10. Float valve 25 controls the flow of refrigerant so that a given liquid refrigerant level is maintained within the heat exchanger. Pump 26 may be activated to assist the refrigerant flow if required. The water pump 9 forces 80° water from the thermal sink through the pipe array 12 and as heat is transferred from the water to the liquid refrigerant, it vaporizes and is recycled via conduit 20.

An indication of the energy efficiency of the foregoing refrigeration cycle can be seen from FIG. 3, a graph of latent heat versus temperature and pressure, which illustrates the changes of state, pressure, and temperature of refrigerant 11 undergoing the cycle described above. Thus, within heat exchanger 14, 96° refrigerant vapor at point 60, at a pressure of 21.97 psi, condenses (65) and gives up its heat of condensation (76.40 BTU/lb.) to the boiling salt water in evaporation zone 16. The now liquid refrigerant contains 27.43 BTU/lb., and after it passes into heat exchanger 10, undergoes adiabatic evaporation (62) resulting in 70° liquid containing 22.02 BTU/lb., 5.71 BTU/lb. being contained within a small amount of vapor produced on evaporation. Next, the remaining liquid is vaporized (63) in heat exchanger 10, taking its heat of vaporization (73.30 BTU/lb.) from the coils 12. The vapour is now compressed and thereby heated (64) by compressor 18 and the cycle is repeated.

Thus it can be seen that the refrigerant gives up 76.40 BTU of heat to the salt water in evaporation zone 16 for an energy cost of only 3.10 BTU, that is, the energy required to heat (compress) the refrigerant from 70° to 96° (from 13.40 to 21.97 p.s.i.). The ratio of the energy given to the boiling salt water to the energy consumed by the compressor will hereinafter be referred to as the coefficient of performance. In the situation outlined above, the coefficient of performance will thus be 76.40/3.10 or 24.64.

Those skilled in the art will appreciate that the foregoing calculations are idealized, and that in actual operation there are mechanical and entropy losses which will lower the coefficient of performance. It should also be noted that a 10° temperature difference between the refrigerant and the thermal sink and boiling salt water was assumed to be required in the foregoing cycle for purposes of illustration. In fact, the foregoing cycle can operate with significantly smaller temperature differentials if more efficient or larger heat exchangers are employed.

For purposes of further illustration, it will now be assumed that the dew point falls from the 76° level as in the foregoing cycle to 64°. In this situation, the pressure in evaporation zone 16 is decreased so that the boiling point of the salt water can be lowered to 74°, and the coefficient of performance is dramatically increased. FIG. 3 illustrates the cycle now in operation.

Thus, within heat exchanger 14, 84° refrigerant vapor at point 70, at a pressure of 17.60 psi, condenses (75) and gives up its heat of condensation (77.48 BTU/lb.) to the boiling salt water in evaporation zone 16. After the now liquid refrigerant passes into heat exchanger 10 (with the assistance of pump 26) it undergoes adiabatic evaporation (72) resulting in 70° liquid. Next, the liquid is vaporized (63) in heat exchanger 10, taking its heat of vaporization from the coils 12. The vapor is next compressed and thereby heated (74), and the cycle is repeated.

This cycle gives up 77.48 BTU of heat to the salt water and the compressor consumes only 1.68 BTU. Accordingly, the coefficient of performance is now 77.48/1.68 or 46.11.

Further increases in the coefficient of performance are easily possible if, as suggested above, heat exchangers 10 and 14 can be operated at a smaller temperature differential. Also, further decreases in the dew point or an increase in temperature of the thermal sink can increase the efficiency of the apparatus. Thus, in a situation where the thermal sink is warmer than the boiling salt water, it is contemplated that the temperature differential across the compressor can approach zero. The coefficient of performance will accordingly greatly increase as the denominator of the heat of condensation/heat of compression ratio is further lowered.

Thus, as the dewpoint falls below 64°, the boiling point of the salt water in evaporation zone 16 is further lowered and the corresponding lower temperature difference across the compressor enables more efficient performance. However, at some point, the pressure differential across the compressor 18 becomes so small that the compressor may surge, entrain liquid refrigerant with vapor refrigerant, and possibly suffer from lubrication problems. To overcome this problem, the amount of air forced through the evaporative cooling apparatus 42 by fan 47 is decreased, and the temperature within the coils 43 is thereby increased. If the pressure in evaporative zone 16 is now allowed to increase, the boiling point of the salt water also increases. This procedure allows the apparatus to be tuned so that the compressor can function at its optimum pressure differential and the greatest possible coefficient of performance that is consistent with the mechanical capabilities of the compressor can be achieved.

In accordance with another aspect of the invention, as the temperature differential between the thermal sink and the dew point continues to increase, for example, if the dew point falls to 50°, further dramatic increases in energy efficiency become possible. Thus, when the dew point is 50°, the boiling point of the salt water can be lowered to 60°, and since the thermal sink is at a temperature of 80°, it can be appreciated that the refrigeration cycle need not be employed.

In this situation, switch 31 opens valve 33 to conduit 28 and opens valve 32; the compressor 18 is shut down; and the thermal cycle comes into operation. Accordingly, 80° refrigerant vapor migrates through conduit 30 and valve 32 to the coils of heat exchanger 14, where it condenses, giving up its heat of condensation to the 60° boiling salt water. As the refrigerant continues to condense, liquid refrigerant builds up in heat exchanger 14. However, pump 26 moves the liquid refrigerant through the valve 33 and conduit 28 back into the relatively hot heat exchanger 10, where it again vaporizes and is recycled. As will be appreciated, this cycle is capable of moving extremely large quantities of heat at very low energy costs, since the only energy required is that used to drive the pump 26.

In view of the foregoing, it can be seen that the system may be adapted to suit the particular requirements of the environment in which the process of the invention is practiced, and can easily be controlled to respond to seasonal or daily fluctuations in ambient conditions. Thus, for a system utilizing a thermal sink of a substantially constant temperature, the higher the dew point, the less efficient the system becomes, that is, the greater energy required per pound of fresh water produced and the lower is the coefficient of performance. As the dew point falls, the pressure in the evaporation zone 16 is decreases so that the boiling point of the water is lowered. This either decreases the size of the temperature differential between the boiling water and the thermal sink, thereby increasing the coefficient of performance, or lowers the boiling temperature below that of the thermal sink so that the efficient thermal cycle can take over. On a humid day, the temperature of the evaporative cooling apparatus will necessarily rise. The boiling point must therefore also rise, generally to at least about 10 degrees higher so that condensation continues with good heat exchange. The more the boiling temperature exceeds the temperature of the thermal sink, the lower will be the coefficient of performance, i.e., the greater will be the energy required to pump the heat from the relatively cooler thermal sink. The rate at which fresh water is produced depends on the size of the overall apparatus and on the efficiency (size) of the heat exchangers employed.

In situations where the temperature of the thermal sink fluctuates, e.g., where the sink comprises the air at ambient temperature or a sand mass exposed to the sun, it will be appreciated that even at constant dewpoint the coefficient of performance will increase and decrease and/or the system will switch from the refrigeration cycle mode to the thermal cycle mode as required by variations in the temperature differential. It should also be noted that in situations where a substantially constant temperature thermal sink is available and where a constant cool temperature is maintainable, e.g., where the dewpoint does not fluctuate dramatically, or where constant temperature cooling water is available, the foregoing apparatus need not employ both a refrigeration cycle and a thermal cycle, as, depending on the temperature differential involved, only one of the two types of heat pumps is necessary.

FIG. 2 illustrates a second embodiment of the apparatus of the invention which differs from the embodiment of FIG. 1 in that the thermal cycle for transferring heat to the evaporation zone is omitted and a second refrigeration cycle is employed to remove the heat of condensation from a condensation zone 66 to the evaporative cooling apparatus 42. The additional refrigeration cycle comprises a compressor 68 interposed between heat exchanger 72 which is disposed within the condensation zone 66, and evaporative cooling apparatus 42.

As an example of the operation this system, it will be assumed that the dewpoint is 75° and that water is being condensed at 65° within condensation zone 66. In this situation, liquid refrigerant vaporizes within heat exchanger 72 as fresh water condenses, the heat of condensation of the water being absorbed as heat of vaporization of the refrigerant. The vapor then exits the heat exchanger via conduit 74, is compressed by compressor 68 such that its temperature is increased to, for example, 85°, and is transported into evaporative cooling apparatus 42. There, the relatively hot vapor condenses on the 75° coils, its heat of condensation being dissipated by evaporative cooling. Next the liquid refrigerant passes through conduit 77 and float valve 80, and enters heat exchanger 72 where it is again vaporized.

Aside from the foregoing refrigerant cycle, the apparatus of FIG. 2 operates in a manner identical to that of the refrigeration cycle mode of the apparatus of FIG. 1. The apparatus of FIG. 2 has advantages in that the boiling and the condensation temperature of the water can be adjusted by varying the vacuum within the evaporation and condensation zones. This allows the respective refrigeration cycles to be tuned in response to variations in the temperature of the thermal sink and/or variations in the dew point in a manner such that the minimum total energy is employed per pound of water produced in response to changes in the overall temperature differential between the thermal sink and the dew point. Also, this embodiment is advantageously employed in areas where a sizeable temperature differential is difficult to produce. This embodiment is less desirable than the embodiment of FIG. 1 in that one extra heat exchange is required.

Figure 4:
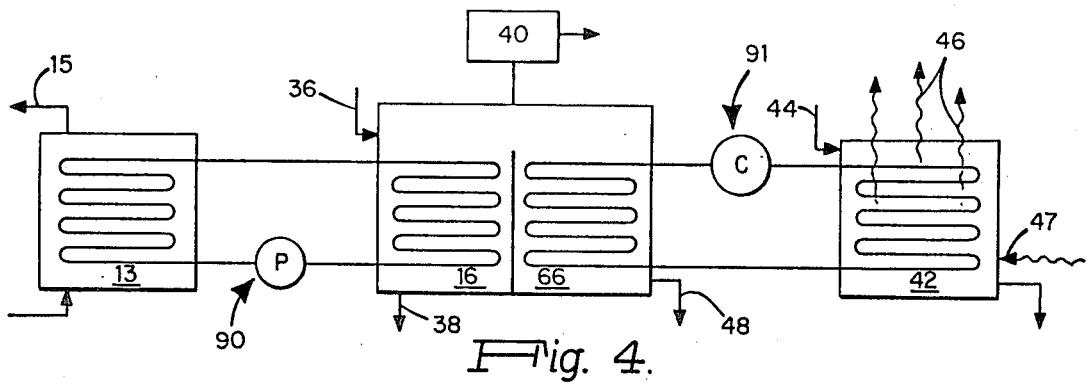
FIGS. 4, 5, and 6 are diagrammatic illustrations of other embodiments of the invention.

FIG. 4 illustrates another embodiment of the invention wherein a thermal cycle 90 is interposed between the thermal sink 13 and evaporation zone 16 and a refrigeration cycle 91 is employed to extract heat from the condensation zone 66 and to dissipate the heat within evaporative cooling apparatus 42. This embodiment may be advantageously employed where, for example, a constant, relatively high temperature thermal sink is available and the dewpoint undergoes wide fluctuations. In this and other arrangements wherein a thermal cycle is used alone on one side of the apparatus, an ammonia refrigerant may be used in place of the frequently employed halocarbon type, since ammonia has a high latent heat. Accordingly, the amount of refrigerant which must be pumped per BTU of heat given to the evporation zone, and thus the energy requirements of the system, are correspondingly reduced.

Figure 5:
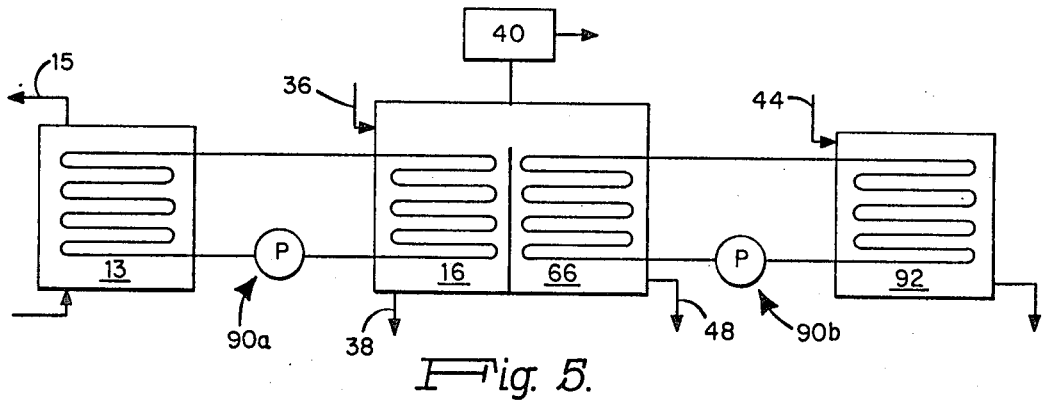

Still another embodiment of the invention is illustrated in FIG. 5. In this embodiment, both the evaporation zone 16 and condensation zone 66 are serviced by thermal cycles 90a, 90b. Where a substantially constant temperature thermal sink and a substantially constant low temperature sink 92 are available, it is possible that the temperature differential may be great enough to employ this embodiment, and fresh water can be produced at extraordinarily low energy costs.

Figure 6:
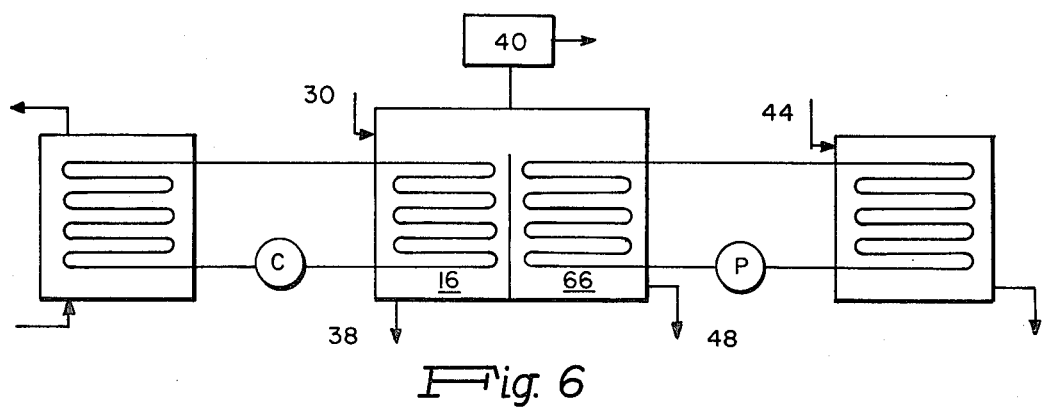

FIG. 6 illustrates another embodiment of the invention wherein a refrigeration cycle provides heat of vaporization and a thermal cycle dissipates heat of condensation. This embodiment is suitable, for example, in the ocean where the refrigeration cycle can extract heat from relatively warm surface water layers, and heat of condensation can be dissipated via the thermal cycle into deeper cold water layers.

Those skilled in the art will appreciate that many modifications will be possible in the foregoing apparatus and process without departing from the scope of the invention. For example, the location and nature of the vacuum producing means and the type of heat exchangers selected form no part of the instant invention. Also, it will be apparent that even though the invention has been described as featuring a heat pump for moving heat from the thermal sink, it is possible to transfer heat directly into the evaporation zone by means of a heat exchanger through which hot water flows if a suitable source of hot water is available. From the foregoing it will also be apparent that various systems using thermal cycles, refrigeration cycles, and combinations thereof to either supply heat to the evaporation zone or to remove heat from the condensation zone are within the scope of the invention. Furthermore, it will be a matter of mechanical skill to provide controls for the apparatus of the invention to enable it to operate automatically, changing to alternate modes of operation and/or adjusting the vacuum in the evaporation zone in response to dewpoint or temperature changes. It will also be possible to adapt the process and apparatus of the invention to desalinize salt water in batches or continuously. Accordingly, other embodiments are within the following claims.

What is claimed is:

1. A process for desalinizing water comprising the steps of:
   feeding salt water to an enclosure defining an evaporation zone maintained at subatmospheric pressure; boiling the water in the evaporation zone and allowing water vapor to pass to a condensation zone; condensing the vapor in the condensation zone; and collecting desalinized water therefrom, wherein the improvement comprises:
   providing the heat of vaporization by transferring heat from a thermal sink comprising a body of water into the evaporation zone and transferring the heat of condensation from the condensation zone into a low temperature sink, at least one of the heat transfers being a transfer from a first temperature to a higher temperature and being effected via a closed system wherein a refrigerant is cyclically condensed and evaporated and wherein the ratio of energy transferred as heat to energy required to effect the transfer is at least 15.

2. The process of claim 1 wherein the low temperature sink comprises evaporative cooling apparatus.

3. The process of claim 1 wherein the closed system comprises a refrigeration cycle.

4. The process of claim 1 wherein one of said heat transfers is effected using a thermal cycle and the other is effected using a refrigeration cycle.

5. The process of claim 1 wherein said ratio is at least 30.

6. A process for desalinizing water comprising the steps of:
   1. feeding salt water to an enclosure defining an evaporation zone maintained at subatmospheric pressure;
   2. transferring heat to the water in the evaporation zone to cause the water to boil, the heat being obtained from a thermal sink and being transferred to the evaporation zone from the thermal sink by a heat pump;
   3. condensing vapor produced in step 2 in an enclosure defining a condensation zone;
   4. removing heat of condensation from the condensation zone by passing water and air about said condensation zone so that heat is removed as a portion of the water undergoes evaporation; and
   5. collecting desalinized water from the condensation zone.

7. The process as set forth in claim 6 wherein the heat pump used to transfer heat from the thermal sink to the water in the evaporation zone comprises a refrigeration cycle heat pump.

8. The process as set forth in claim 6 wherein the temperature in the evaporation zone is lower than the temperature of the thermal sink and the heat pump used to transfer heat to the water in the evaporation zone comprises a thermal cycle heat pump comprising a closed system for circulating a refrigerant which is condensed in the evaporation zone, pumped from the condensation zone to the thermal sink, and vaporized.

9. The process as set forth in claim 6 wherein the heat pump comprises a refrigeration cycle heat pump having a compressor wherein the heat transfer from the thermal sink to said evaporation zone is performed with a low temperature change across the compressor so that the refrigeration cycle exhibits a high coefficient of performance.

10. A process for desalinizing water comprising the steps of:
    1. feeding salt water to an enclosure defining evaporation zone maintained at subatmospheric pressure;
    2. transferring heat to the water in the evaporation zone from a thermal sink to cause the water to boil, when the temperature of the thermal sink is less than the temperature in the evaporation zone, by a refrigeration cycle heat pump, and when the temperature of the thermal sink is greater than the temperature in the evaporation zone, by a thermal cycle heat pump;
    3. condensing vapor produced on boiling in an enclosure defining a condensation zone;
    4. removing the heat of condensation from the condensation zone by passing water and air about said condensation zone so that heat is removed as a portion of the water undergoes evaporation; and
    5. collecting desalinized water from the condensation zone.

11. Apparatus for desalinizing water comprising:
    an enclosure defining an evaporation zone for boiling salt water;
    vacuum producing means for maintaining a subatmospheric pressure in the evaporation zone;
    an enclosure defining a condensation zone in communication with the evaporation zone for condensing vapor received from the evaporation zone;
    a heat pump for transferring heat from a thermal sink into the evaporation zone to supply heat of vaporization to water to be vaporized; and
    evaporative cooling means in thermal communication with the condensation zone for removing the heat of condensation therefrom, said evaporative cooling means comprising a structure about which air and water are passed so that the structure is cooled as a portion of the water undergoes evaporation.

12. The apparatus as set forth in claim 11 comprising a pair of alternately useable heat pumps for transferring heat to the evaporation zone and switch means for activating a selected one of said heat pumps, said heat pumps comprising a refrigeration cycle and a thermal cycle.

13. The apparatus as set forth in claim 11 wherein the condensation zone comprises a portion of the interior of the evaporative cooling means.

14. The apparatus as set forth in claim 11 wherein the heat pump is a refrigeration cycle heat pump.

15. The apparatus as set forth in claim 11 wherein a heat pump is interposed between said condensation zone and the structure comprising the evaporative cooling means.

16. Apparatus for desalinizing water comprising
an enclosure defining an evaporation zone for boiling salt water;
vacuum producing means for maintaining a subatmospheric pressure in the evaporation zone;
an enclosure defining a condensation zone in communication with the evaporation zone for condensing vapor received from the evaporation zone;
heat transfer means for conducting heat from a source of hot water to the evaporation zone to provide heat of vaporization to water to be boiled; and
evaporative cooling means in thermal communication with the condensation zone for removing the heat of condensation therefrom, said evaporative cooling means comprising a structure about which air and water are passed so that the structure is cooled as a portion of the water undergoes evaporation.

17. The apparatus as set forth in claim 16 wherein a refrigeration cycle provides the thermal communication between the condensation zone and the evaporative cooling means.

18. The process as set forth in claim 6 wherein the thermal sink comprises a high surface area body of water having means to retard evaporation.

19. The process as set forth in claim 6 wherein the thermal sink comprises a mass of hydrated sodium sulfate.

20. A process for desalinizing water comprising the steps of:
1. feeding salt water to an enclosure defining an evaporation zone maintained at subatmospheric pressure;
2. transferring heat to the water in the evaporation zone to supply heat of vaporization thereto, the heat being obtained from a thermal sink and being transferred to the evaporation zone from the thermal sink by a heat pump;
3. condensing vapor produced in step 2 in an enclosure defining a condensation zone;
4. removing heat of condensation from the condensation zone by dissipating it into a low temperature heat sink; and
5. collecting desalinized water from the condensation zone.

* * * * *